US011539511B2

United States Patent
Kapinos et al.

(10) Patent No.: US 11,539,511 B2
(45) Date of Patent: Dec. 27, 2022

(54) USE OF CONDUCTIVE INK SEGMENTS TO ESTABLISH SECURE DEVICE KEY

(71) Applicant: Lenovo (Singapore) Pte. Ltd., Singapore (SG)

(72) Inventors: Robert J. Kapinos, Durham, NC (US); Robert Norton, Raleigh, NC (US); Russell Speight VanBlon, Raleigh, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 453 days.

(21) Appl. No.: 16/535,979

(22) Filed: Aug. 8, 2019

(65) Prior Publication Data

US 2021/0044430 A1 Feb. 11, 2021

(51) Int. Cl.
  *H04L 9/08* (2006.01)
  *G06F 9/30* (2018.01)
  *H05K 1/09* (2006.01)
  *C09D 11/52* (2014.01)

(52) U.S. Cl.
  CPC ........ *H04L 9/0822* (2013.01); *G06F 9/30098* (2013.01); *H04L 9/0861* (2013.01); *H05K 1/092* (2013.01); *C09D 11/52* (2013.01)

(58) Field of Classification Search
  CPC ... H04L 9/0822; H04L 9/0861; H04L 9/0866; G06F 9/30098; G06F 21/44; G06F 21/602; H05K 1/092; H05K 1/0293; H05K 2201/09927; H05K 1/0275; H05K 1/0268; C09D 11/52
  See application file for complete search history.

(56) References Cited

U.S. PATENT DOCUMENTS

| | | | |
|---|---|---|---|
| 7,599,192 B2 * | 10/2009 | Pennaz | H01M 6/40 361/761 |
| 10,686,963 B1 * | 6/2020 | Rodriguez | H04N 1/32261 |
| 10,811,777 B1 * | 10/2020 | Fuchi | H01Q 1/36 |
| 2002/0108441 A1 * | 8/2002 | Liu | G01F 23/74 73/305 |
| 2006/0186970 A1 * | 8/2006 | Shi | H05K 1/0233 333/176 |
| 2008/0254356 A1 * | 10/2008 | Liersch | H01M 10/425 429/97 |
| 2013/0228628 A1 * | 9/2013 | Bona | G06Q 20/409 235/487 |
| 2015/0333547 A1 * | 11/2015 | Na | H04W 4/80 361/93.1 |
| 2017/0209116 A1 * | 7/2017 | Erkamp | A61B 8/0841 |
| 2018/0061383 A1 * | 3/2018 | Hovey | G10H 1/0558 |
| 2020/0387265 A1 * | 12/2020 | Yoshida | G06F 3/0446 |

* cited by examiner

*Primary Examiner* — Abiy Getachew

(74) *Attorney, Agent, or Firm* — John M. Rogitz; John L. Rogitz

(57) ABSTRACT

In one aspect, a system component includes a printed circuit (PC) board on which plural conductive ink segments are disposed. The system component also includes a sealed housing that houses the PC board. The plural conductive ink segments define a bit pattern to establish a key.

20 Claims, 5 Drawing Sheets

USE OF CONDUCTIVE INK SEGMENTS TO ESTABLISH SECURE DEVICE KEY

FIELD

The present application relates to technically inventive, non-routine solutions that are necessarily rooted in computer technology and that produce concrete technical improvements. In particular, the present application relates to use of conductive ink segments to establish a key such as a secure device key.

BACKGROUND

Many computing devices are manufactured with secure device keys that are unique per device, unpredictable, cannot be read directly from any read-only memory (ROM) of the device or by accessing any bus in the device, and are physical and not changeable by reprogramming the device. However, the present application recognizes that effectively establishing such keys without powering up the device is a manufacturing challenge but is desirable to prevent exposure of the key.

Additionally, today many devices establish such keys through a central processing unit (CPU) that includes micro fuses that blow in response to a command. Once blown, these fuses form a key bit pattern, but this approach has at least two problems. First, the device must be running in order to blow the fuses. Second, software must exist to create the key but such software must reside on the device and, as such, can be stolen out of it and thus expose the key itself and thus defeat the security it is meant to provide.

There are currently no adequate solutions to the foregoing computer-related, technological problem.

SUMMARY

Accordingly, in one aspect a device includes plural system components comprising at least a processor and storage accessible to the processor. The device also includes plural conductive ink segments that define a bit pattern to establish a key.

The plural conductive ink segments may be sealed in a protected housing within the device. The device may attempt to send electricity through each of the conductive ink segments to identify the bit pattern and the device may then identify the bit pattern by identifying the presence or absence of current along each conductive ink segment of the plural conductive ink segments. The device may return a first predetermined value for each conductive ink segment for which the absence of current is identified and may return a second predetermined value for each conductive ink segment for which the presence of current is identified, where returned predetermined values may be used to identify the bit pattern and where the first predetermined value may be different from the second predetermined value. The bit pattern may then be loaded into a register as a bit array, where the bit array may indicate the key. The key may be an encryption key and/or a secure device key.

In some examples, at least a first conductive ink segment of the plural conductive ink segments may have at least a portion thereof scraped away for return of zero. The portion of the first conductive ink segment may be scraped away via mechanical etching and/or chemical etching. Additionally or alternatively, at least the first conductive ink segment may be printed with at least one break in the first segment.

In another aspect, a method includes disposing plural conductive ink segments on a printed circuit (PC) board, where the plural conductive ink segments define a bit pattern to establish a key. The method also includes disposing the PC board within a protective housing of a device. The protective housing may also include a register into which the bit pattern is loadable.

In some examples, the method may also include, subsequent to disposing the plural conductive ink segments on the PC board, etching away a portion of a first conductive ink segment of the plural conductive ink segments. The portion of the first conductive ink segment may be etched away via mechanical etching and/or chemical etching. Additionally or alternatively, in some examples the disposing the plural conductive ink segments on the PC board may include disposing at least a first conductive ink segment on the PC board with at least one break in the first segment between respective ends of the first segment that are connected to respective pins on the PC board.

In still another aspect, a system component includes a printed circuit (PC) board on which plural conductive ink segments are disposed, with the plural conductive ink segments defining a bit pattern. The system component also includes a sealed housing that houses the PC board.

The bit pattern may establish a security key. Additionally, the PC board may include a register into which the bit pattern is loadable for reading by a central processing unit (CPU).

The details of present principles, both as to their structure and operation, can best be understood in reference to the accompanying drawings, in which like reference numerals refer to like parts, and in which:

DETAILED DESCRIPTION

Figure 1:
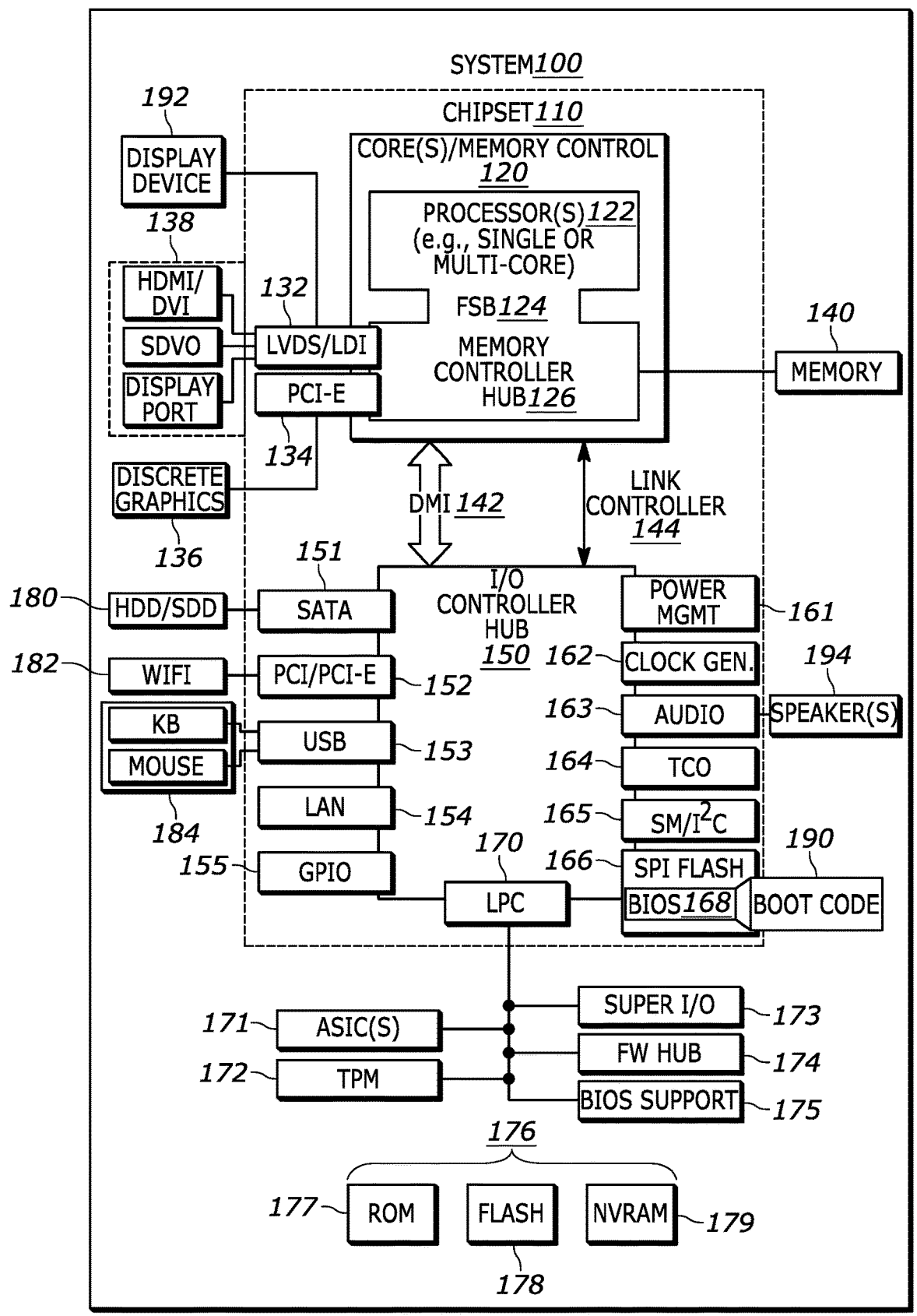
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C#or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the system components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
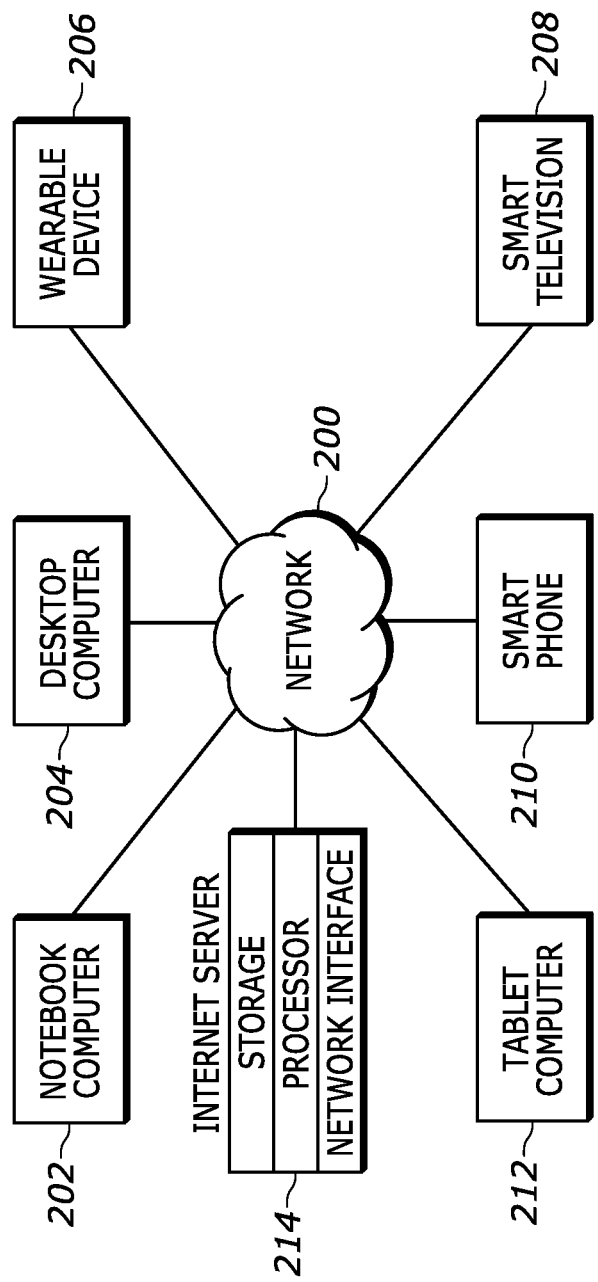
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
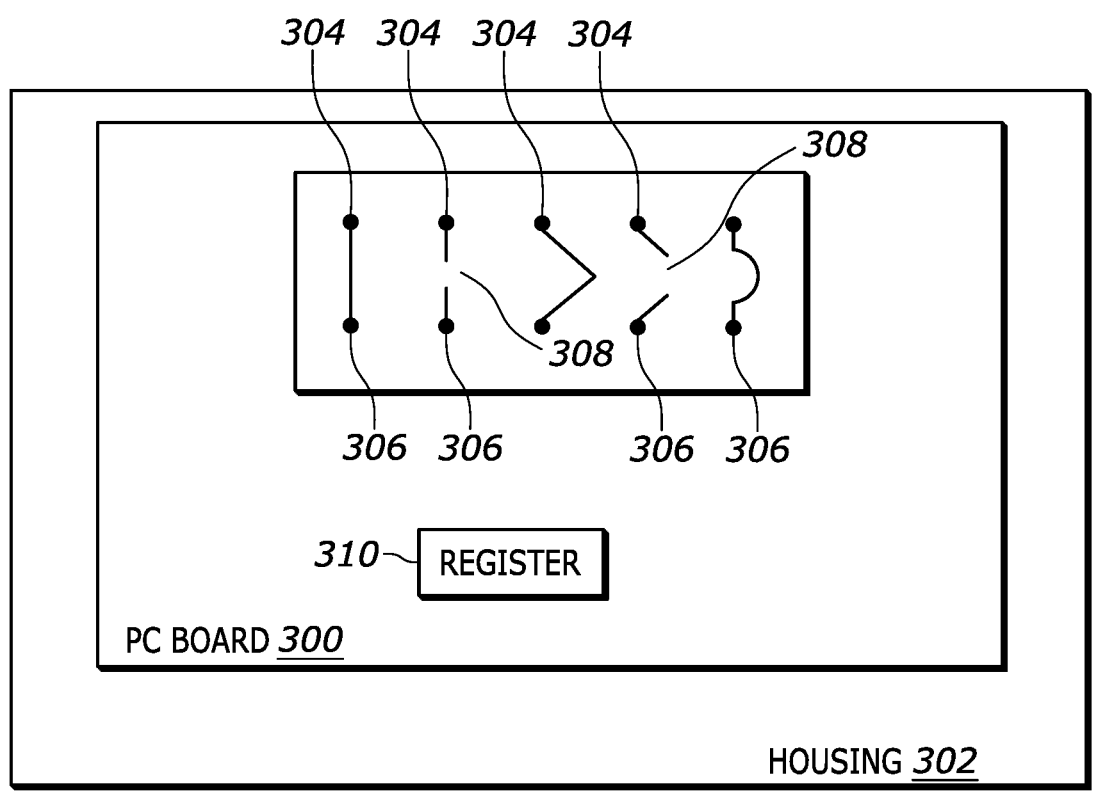
FIG. 3 shows an example printed circuit (PC) board with conductive ink segments in accordance with present principles.

Now referring to FIG. 3, it shows an example printed circuit (PC) board 300 disposed within a protected housing 302. In some embodiments, the PC board 300 may establish a system on a chip and/or may have a processor located on it for undertaking functions to be described below.

The protected housing 302 may be a housing that is configured for components within it to be destroyed should someone try to open it or access its contents subsequent to it being manufactured and sealed. For example, the housing 302 may be formed through potting or encapsulation where an epoxy resin, thermosetting plastic, silicone rubber, or other suitable material hardens or cures after insertion into the housing 302. This material may even fill all vacant areas of the housing's shell or mold with the fully assembled PC board 300 already mounted inside. Furthermore, in some examples this material may be non-transparent and/or dark-colored (e.g., black) so that a person could not see through the material and to components of the PC board 300 should the person be able to remove the shell or mold of the housing 302.

In addition to or in lieu of encapsulation or potting, non-transparent or dark-colored conformal coating, such as a so-called 2 k coating, may also be used along with other ways of permanently securing the housing 302 to ensure that components of the PC board 300 would be destroyed, including the conductive ink segments 304 to be described below, should someone attempt to open the housing 302 to look at or access the segments 304.

Now describing the aforementioned conductive ink segments 304, plural segments 304 are shown in FIG. 3 that are understood to be capable of conducting electricity. For example, the segments 304 may be composed of ink infused with graphite or other conductive material(s). The ink segments 304 may applied to the PC board 300 through a silk screening process or other suitable process. Additionally, though only five segments 304 are shown for simplicity, note that a micro-array of these segments may range from hundreds to thousands of segments.

As also shown in FIG. 3, each segment 304 may be connected at opposing ends to a respective pin 306 of the PC board 300 through which electricity may be applied in accordance with present principles. Each pin 306 may be connected to one or more current or electrical sensors for sensing the existence or absence of current along the respective segment 304 in accordance with present principles. For example, resistors and/or Hall effect sensors may be used.

It may be further appreciated from FIG. 3 that one or more of the segments 304 may have a break 308 at some point along the respective segment 304 between its respective pins 306 so that such a segment 304 would not be continuous between its respective pins 306. Segments 304 with a break in them may result in the current sensor(s) not being able to sense current running through those segments 304 (e.g., have an infinite resistance since electricity would not be able to travel across the break) when the PC board 300 or other component attempts to run electricity through those respective segments 304. In contrast, segments 304 without a break may result in the current sensor(s) being able to sense the presence of current (e.g., with relatively low resistance). It may also be appreciated from FIG. 3 that while some or all of the segments 304 may be linear between respective pins 306 for the segment 304, in some examples one or more of the segments 304 may be non-linear as shown and may instead form other patterns along at least a portion thereof, such as a "V" shape or "U" shape as shown.

In some embodiments, complete segments 304 and segments 304 with breaks in them may be formed by printing the respective segments 304 with those respective configurations. However, in other embodiments all segments 304 may be initially printed/manufactured as complete segments 304 and then certain segments 304 may have portions scraped away at random to establish those segments 304 as having breaks in them. For example, mechanical or chemical etching may be used to establish breaks in certain segments 304.

As also shown in FIG. 3, the PC board 300 or another component within the housing 302 may have a register 310 disposed thereon. The register 310 may be volatile memory that only maintains its data while powered and does not store data while in an off state. Thus, when electricity is applied to each segment 304 through a pin 306, the absence of current may be determined and indicated in the register 310 as the integer zero (or another first predetermined value) while the existence of current may be determined and indicated in the register 310 as the integer one (or another second predetermined value) to thus establish a bit pattern based on the randomly-selected segments 304 which have breaks in them. Collectively, the sequence of zeros and ones may be populated into/stored in the register 310 to establish a bit array that may indicate a secure device key or encryption key based on a mapping to another domain of data (e.g. integers from zero to nine).

Figure 4:
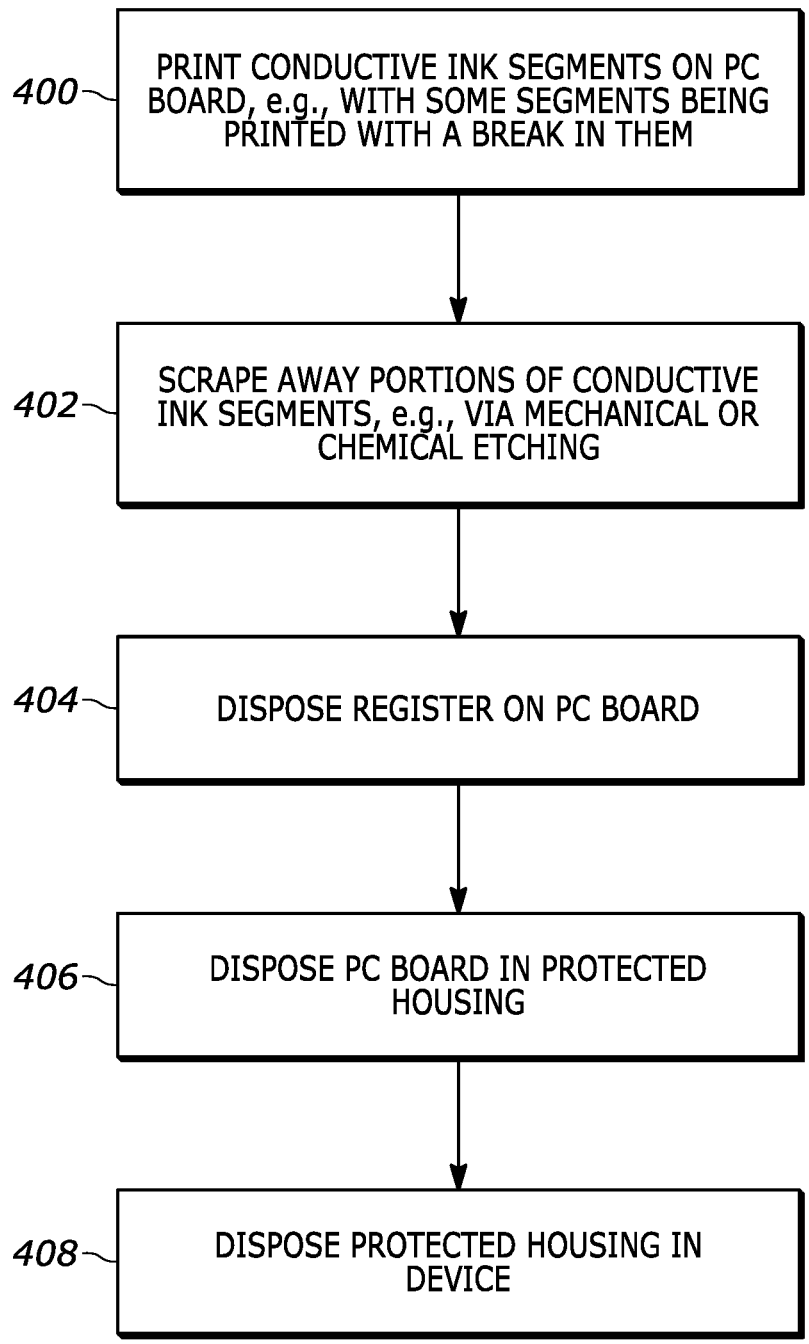
FIG. 4 is a flow chart of an example production process for producing a PC board with conductive ink segments in accordance with present principles.

Now describing FIG. 4, a flow chart is shown of an example production process for producing a PC board with conductive ink segments in accordance with present principles. Beginning at block 400, conductive ink segments may be printed on the PC board. In some embodiments, the conductive ink segments may be printed with some selected at random to be printed with breaks in them. In these embodiments, the process may flow directly to block 404.

However, in other embodiments all conductive ink segments may be initially printed as continuous between pins of the PC board to which they are connected. In these embodiments, the process may first flow to block 402. At block 402 portions of conductive ink segments selected at random may be scraped or scratched away, such as via mechanical or chemical etching.

The process may then flow to block 404 where a register may be disposed on the PC board. From there the process may proceed to block 406 where the PC board may be disposed in a protective housing. In some embodiments, this may include mounting the PC board in a housing shell and then potting the shell with material as disclosed above. Thereafter, the process may move to block 408 where the protected housing may be disposed within a computing device and connected to other components for those other components to be able to communicate with the PC board to identify and use a key indicated by the conductive ink segments consistent with present principles.

Figure 5:
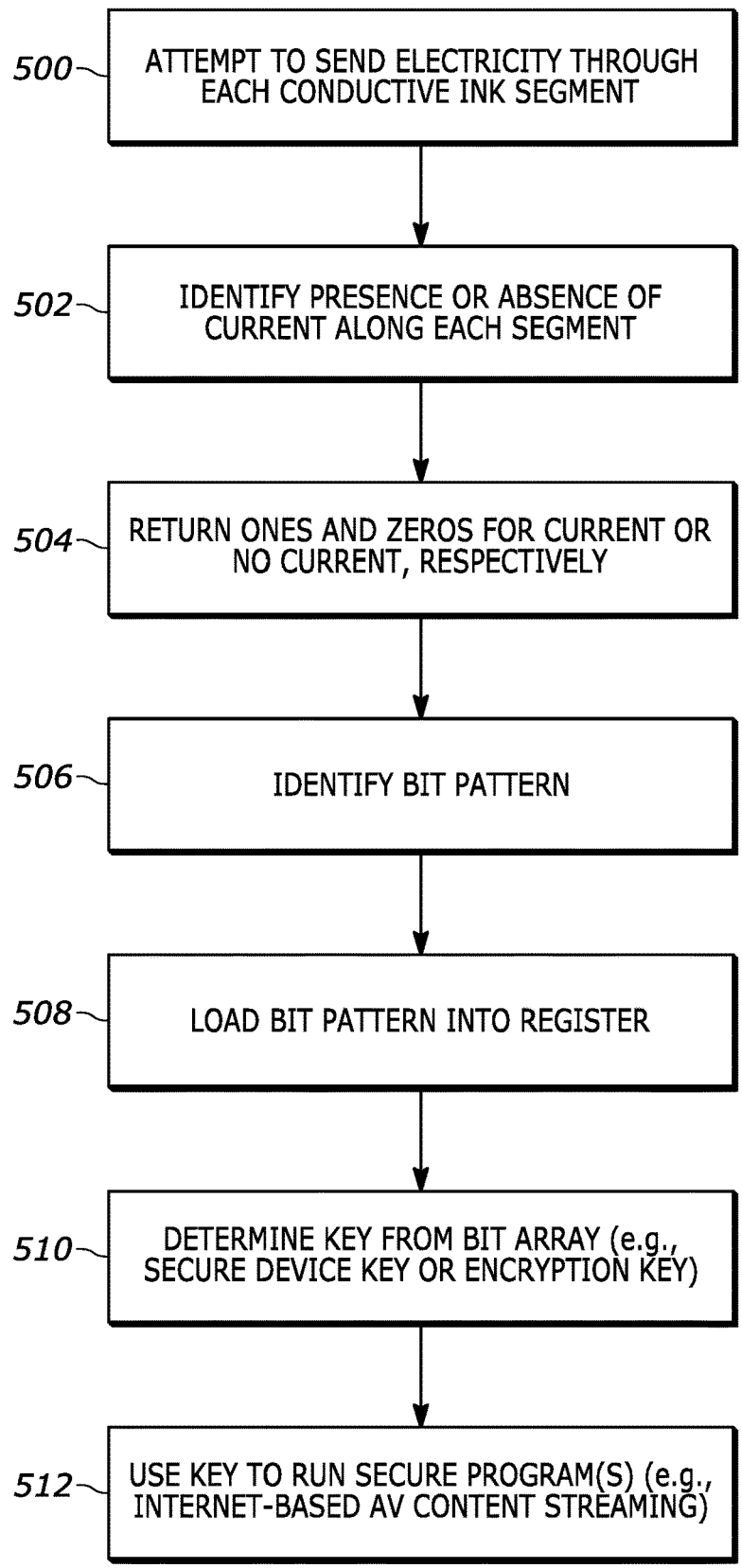
FIG. 5 is a flow chart of example logic that may be executed by a PC board in accordance with present principles.

Continuing the detailed description in reference to FIG. 5, it shows example logic that may be executed by a device such as the system 100 and even a PC board specifically in accordance with present principles. Note that while FIG. 5 illustrates the logic in flow chart format, state logic or other equivalent logic may be used. Further, note that the logic of FIG. 5 may be executed each time the system 100 or PC board is powered on from an off state.

Beginning at block 500, the logic may attempt to send an electric charge through each conductive ink segment disposed on a PC board consistent with present principles. The logic may then proceed to block 502 where the presence or absence of current along each respective segment may be identified. Then at block 504 ones and zeros may be returned for segments for which current or no current was sensed, respectively. Thereafter the logic may flow to block 506 where a bit pattern may be identified or established based on the return of ones and zeros, and then at block 508 the bit pattern may be loaded into a register on the PC board.

From block 508 the logic may then proceed to block 510 where the PC board or other component of a computer system in which the PC board is disposed (e.g., a central processing unit (CPU)) may determine a key from the bit array that is established by the bit pattern, such as a secure device key and/or encryption key. Thereafter the logic may proceed to block 512 where the system may use the key to run a secure program that is encrypted so that no other internal system components or other devices can "see" into that environment since it is sandboxed. For instance, the program may be a secure Internet-based audio video (AV) content streaming application for streaming proprietary AV content to the system having the PC board for presentation using the system. Furthermore, in examples where the key is a secure device key, an encryption key for communicating with other devices may even be derived from that secure device key.

It may now be appreciated that present principles provide for improved computer hardware that improves the security and functionality of the devices disclosed herein. The disclosed concepts are thus rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
    plural system components comprising at least a processor and storage accessible to the processor;
    plural conductive ink segments that define a bit pattern to establish an encryption key for use by one or more of the plural system components, each conductive ink segment comprising respective first and second ends; and
    a respective pin disposed at each first and second end of each conductive ink segment, wherein the device attempts to send electricity through each respective conductive ink segment via the respective pins disposed at the respective first and second ends of each respective conductive ink segment.

2. The device of claim 1, wherein the device attempts to send electricity through each of the conductive ink segments to identify the bit pattern.

3. The device of claim 2, wherein the device identifies the bit pattern by identifying the presence or absence of current along each conductive ink segment of the plural conductive ink segments while attempting to send electricity though each conductive ink segment.

4. The device of claim 3, the device returns a first predetermined value for each conductive ink segment for which the absence of current is identified and returns a second predetermined value for each conductive ink segment for which the presence of current is identified, the returned predetermined values being used to identify the bit pattern, the first predetermined value being different from the second predetermined value.

5. The device of claim 4, wherein the bit pattern is loaded into a register as a bit array, the register established by volatile memory that does not store the bit array while in an off state.

6. The device of claim 5, wherein the bit array indicates the encryption key.

7. The device of claim 4, wherein at least a first conductive ink segment of the plural conductive ink segments is printed with at least one break in the first segment.

8. The device of claim 1, wherein the plural conductive ink segments are sealed in a protected housing within the device.

9. A method, comprising:
    disposing plural conductive ink segments on a printed circuit (PC) board, the plural conductive ink segments defining a bit pattern to establish a key; and
    disposing the PC board within a protective housing of a device;
    wherein the disposing the plural conductive ink segments on the PC board comprises disposing at least a first conductive ink segment on the PC board with at least one break in the first segment between respective ends of the first segment that are connected to respective pins on the PC board.

10. The method of claim 9, wherein the protective housing also comprises a volatile register into which the bit pattern is loadable.

11. A system component, comprising:
    a printed circuit (PC) board on which plural conductive ink segments are disposed, the plural conductive ink segments defining a bit pattern, each conductive ink segment comprising respective first and second ends;
    a respective pin disposed on the PC board at each first and second end of each conductive ink segment, the pins configured on the PC board for attempting to send electricity through each respective conductive ink segment via the respective pins disposed at the respective first and second ends of each respective conductive ink segment; and
    a sealed housing that houses the PC board.

12. The system component of claim 11, wherein the bit pattern establishes an encryption key.

13. The system component of claim 11, wherein the PC board comprises a register in volatile memory into which the bit pattern is loadable for reading by a processor.

14. The device of claim 1, wherein the conductive ink segments are linear.

15. The device of claim 1, wherein at least one of the system components that uses the encryption key is configured to use the encryption key to execute an encrypted application.

16. The device of claim 15, wherein the encrypted application is executed to stream content at the device.

17. The device of claim 6, wherein the bit array indicates the encryption key based on a mapping of the bit pattern to another domain of data.

18. The device of claim 17, wherein the other domain of data is related to integers from zero to nine.

19. The method of claim 9, wherein the key is an encryption key.

20. The system component of claim 11, wherein two or more conductive ink segments of the plural conductive ink segments each comprise at least one break between their respective pins.

* * * * *